（12）United States Patent
Rayo Mayoral et al.

(10) Patent No.: US 7,968,069 B2
(45) Date of Patent: Jun. 28, 2011

(54) CATALYST, ITS PREPARATION AND USE FOR HYDRODESULFURIZATION OF RESIDUA AND HEAVY CRUDES

(75) Inventors: Patricia Rayo Mayoral, Eje Central Norte Lázaro Cárdenas (MX); Jorge Ancheyta Juárez, Eje Central Norte Lázaro Cárdenas (MX); Jorge Fernando Ramírez Solis, Eje Central Norte Lázaro Cárdenas (MX); Samir Kumar Maity, Eje Central Norte Lázaro Cárdenas (MX); Mohan Singh Rana, Eje Central Norte Lázaro Cárdenas (MX); Fernando Alonso Martínez, Eje Central Norte Lázaro Cárdenas (MX)

(73) Assignee: Instituto Mexicano del Petroleo, Mexico City (MX)

( * ) Notice: Subject to any disclaimer, the term of this patent is extended or adjusted under 35 U.S.C. 154(b) by 817 days.

(21) Appl. No.: 11/582,552

(22) Filed: Oct. 18, 2006

(65) Prior Publication Data

US 2007/0123416 A1    May 31, 2007

(51) Int. Cl.
*B01D 47/06* (2006.01)
*B01J 20/00* (2006.01)

(52) U.S. Cl. .................... 423/242.1; 502/415

(58) Field of Classification Search .................... None
See application file for complete search history.

(56) References Cited

U.S. PATENT DOCUMENTS

| | | | |
|---|---|---|---|
| 4,867,757 A | 9/1989 | Payne | |
| 4,962,280 A * | 10/1990 | Tijburg et al. | 502/439 |
| 5,229,347 A * | 7/1993 | Prada et al. | 502/221 |
| 5,545,602 A | 8/1996 | Nelson et al. | |
| 6,218,333 B1 | 4/2001 | Gabrielov et al. | |
| 6,403,526 B1 * | 6/2002 | Lussier et al. | 502/439 |
| 2004/0031730 A1 * | 2/2004 | Gislason et al. | 208/245 |
| 2005/0245780 A1 * | 11/2005 | Chang et al. | 585/639 |
| 2007/0099797 A1 * | 5/2007 | Hu et al. | 502/319 |

FOREIGN PATENT DOCUMENTS

| | | |
|---|---|---|
| CN | 1552520 | 12/2004 |
| WO | 02053286 | 7/2002 |

OTHER PUBLICATIONS

Pierre Alphonse et al., "Structure and thermal behavior of nanocrystalline boehmite", Thermochimica Acta 425 (2005) 75-89.
Pierre Alphonse et al., "Surface and porosity of nanocrystalline boehmite xerogels", Journal of Colloid and Interface Science 290 (2005) 208-219.
J. Ramirez et al., Analysis of the hydrotreatment of Maya heavy crude with NiMo catalysts supported on TiO2-Al2O3 binary oxides Effect of the incorporation method of Ti, Catalysis Today 109 (2005) 54-60.
Ramirez et al., The role of titania in supported Mo, CoMo, NiMo, and NiW hydrodesulfurization catalysts: analysis of past and new evidences, Catalysis Today 98 (2004) 19-30.
Alphonse et al., Surface and porosity of nanocrystalline boehmite xerogels, Journal of Colloid and Interface Science 290 (2005) 208-219.
Al-Zeghayer et al., On the effects of calcination conditions on the surface and catalytic properties of gamma-Al2-O3-supported CoMo hydrodesulfurization catalysts, Applied Catalysis A: General 292 (2005) 287-294.
Foger, T. Catalysis Science and Technology, 6 (1984) 231.
Tanabe, Studies in Surfaces Science and Catalysis, 51 (1989) 11-14.
Topsoe et al., Hydrotreating Catalysis, Springer 1996.
Zhaobin et al., Applied Catalysis 63(1990) 305-317.

* cited by examiner

*Primary Examiner* — Melvin C Mayes
*Assistant Examiner* — Sheng H Davis
(74) *Attorney, Agent, or Firm* — Roylance, Abrams, Berdo & Goodman, L.L.P.

(57) ABSTRACT

A catalyst for hydrotreating, especially hydrodesulfurization, of residua and heavy crudes is prepared by synthesizing the support from titanium and boehmite, to form either a titanium/alumina support ($TiO_2/Al_2O_3$) or a titanium-alumina support ($TiO_2$—$Al_2O_3$) that is thereafter provided with at least one hydrogenating metal from group VIB in oxide form and a promoter from group VIII also in oxide form. The ($TiO_2/Al_2O_3$) support is prepared from boehmite, which is peptized by using an inorganic acid, then extruded, calcined and impregnated with a solution containing titanium, while the ($TiO_2$—$Al_2O_3$) support is prepared by admixing boehmite with a titanium-containing solution, peptized using an inorganic acid, extruded and calcined to obtain the titanium-alumina support.

15 Claims, 7 Drawing Sheets

CATALYST, ITS PREPARATION AND USE FOR HYDRODESULFURIZATION OF RESIDUA AND HEAVY CRUDES

CROSS-REFERENCE TO RELATED APPLICATIONS

This application claims the benefit under 35 U.S.C. §119 of Mexican Patent Application No. PA/a/2005/012893, filed Nov. 29, 2005, which is hereby incorporated by reference in its entirety.

FIELD OF THE INVENTION

The present invention relates to a catalyst for hydrotreating heavy crude and residua. More particularly, the present invention relates to hydrodesulfurization catalysts having improved hydrodesulfurization activity and are not deactivated quickly by contaminants, such as nickel and vanadium that are present in heavy crude oil feedstock.

BACKGROUND OF THE INVENTION

In the last decades, the increase in the demand of fuels has caused a decrease in the reserves of light crudes throughout the world. As a consequence, there has been an increase in the production and availability of heavy crudes, causing an increase in the research to make better use of heavy crude oil.

The low yields of light distillates recovered from the heavy crudes as well as the need to reduce the high levels of contaminants such as sulfur, nitrogen asphaltenes carbon and metals (Ni and V) have oriented the research efforts towards the hydrotreatment processes with the aim of improving the properties of heavy feeds.

At present, the environmental restrictions throughout the world have made mandatory the search for more effective catalysts in order to obtain better quality fuels with a minimum content of polluting agents like sulfur and nitrogen.

The catalysts used for hydrotreating of residua and heavy crudes are an interesting alternative to remove impurities such as sulfur, metals, asphaltenes, etc., and to increase notably the production of middle distillates. In this sense the formulation of the catalyst involves the control of its properties, the interaction of the active components with the support, and the method of preparation. The methodology of incorporation of the active phases or composition of the support can change the activity and stability of the catalyst. At present there are few reports in the literature that directly refer to the hydrotreatment of heavy crudes and residua; the studies have rather focused on the treatment of residua obtained from light or medium heavy crudes.

The majority of patents relating to the present invention claim the use of metals of groups VIB and VIII of the periodic table, supported on alumina. Likewise, other patents claim the use of Mo with Ni and/or Co. Several others include the use of compounds based in the elements of groups IA, IIA, VA, VIIA, IIB, IVB, VB and VIIB of the periodic table using different types of supports such as alumina, zeolites, silica, silica-alumina, magnesium, silica-magnesium, titanium, activated carbon, clays, alumina-boron, zirconium and combinations of them. Some of these patents are described below.

U.S. Pat. No. 4,687,757 discloses an alumina support which can contain compounds of transition metals from the groups IB, VB, VIB, VIIB and the VIII of periodic table, the support contains at least one compound of titanium and one of molybdenum, having a surface area in the 100-250 $m^2/g$ interval. In the detailed description of the patent, a pore volume of 0.2-2.0 $cm^3/g$ is mentioned, which was determined in a mercury penetration equipment, used to determine macroporosity, as demonstrated in example 1, in the preparation of the catalyst D having pore volume 1.03 $cm^3/g$. From these data, it is evident that the catalyst of the referred patent is used mainly in the hydrodemetallization stage and not in the hydrodesulfurization stage.

U.S. Pat. No. 5,545,602 discloses a catalyst with a composition containing 13-24 weight % of metals of group VIII, 0-2 weight % of metals of group VIB and one phosphorus oxide, with a surface area of 150-240 $m^2/g$, total pore volume of 0.7-0.98 $cm^3/g$, and a pore volume distribution where less than 20% corresponds to the micro-pore zone with diameter of 100 Å (10 nm), around 34-74% corresponds to pores within the 100-200 Å interval (10-20 nm), from 26-46% corresponds to the region of meso-pores with pore diameter of 200 Å (20 nm), 22-32% with pore diameters of 250 Å (25 nm), and the macro-pore region with diameters of 1,000 Å (100 nm) contributes with 14-22%. This catalyst is used mainly for residua feedstock having 4-6° API gravity.

Chinese Patent No. 1,552,520 claims a catalyst for the hydrodesulfurization of hydrocarbons which consists of a support of gamma alumina with titania and active metals of groups VIB and VIII. A mixture of dry aluminum hydroxide and titanium dioxide ($TiO_2$) powder. To this mixture an alkaline solution containing molybdenum and/or tungsten is added.

U.S. Pat. No. 6,218,333 discloses a detailed method for the preparation of a catalyst by means of a porous support (alumina, silica-alumina, silica, titanium, boron, zeolites, zirconium, magnesium and their combinations) with one or more active metals (Mo, W, Co, Ni and their oxides, sulfides and mixtures of them). This results in an initial catalytic prototype which contains volatile compounds. Later, the concentration of these volatile compounds is diminished by means of an ex-situ or in situ reduction stage. The catalyst is used for the hydrotreating of hydrocarbon feedstocks.

The patent WO 0,253,286 claims a hydroprocessing catalyst for the conversion of the heavy oil hydrocarbons, which contains a transition metal of group VI in a concentration of 7 to 20 weight % and a metal of group VIII in a concentration of 0.5-6 weight %, calcined to obtain the corresponding oxide over a support of alumina. The resultant catalyst has 100 to 180 $m^2/g$ specific surface area and total pore volume of 0.55 $cm^3/g$ or higher. The catalyst lowers the metals contained in heavy hydrocarbons and enhances the elimination of asphaltenes, sulfur, nitrogen and Conradson carbon, besides, the catalyst shows a decrease in the formation of sediments and better conversion in ebullated bed operations. In fixed bed operation a product with improved stability for its storage is obtained. A hydroprocessing of heavy hydrocarbon feedstock with the catalyst in fixed or ebullated bed is disclosed.

SUMMARY OF THE INVENTION

A hydrotreating catalyst has now been found that has significant use, for example, in the second stage of a hydrotreating process for residua and heavy crudes, mainly for the hydrodesulfurization reaction.

The catalyst is produced by a process which comprises forming a support for the catalyst from titanium and boehmite by either a) peptizing a first portion of boehmite by admixture with an inorganic acid to form a binder, contacting the binder with a second portion of boehmite and deionized water to form a homogeneous paste, forming the homogeneous paste into extrudates, aging, drying and calcining to obtain gamma alumina, impregnating a titanium precursor in the gamma alumina extrudate, aging, drying and calcining the impregnated gamma alumina support to obtain a $TiO_2/Al_2O_3$ catalyst support in which the titanium is deposited on the surface of the gamma alumina; or b) admixing a titanium precursor with boehmite, peptizing the admixture by further admixture with an inorganic acid and deionized water to obtain a homogeneous paste, extruding the paste to form extrudates which are aged, dried and calcined to form gamma alumina and a $TiO_2$—$Al_2O_3$ catalyst support in which the titanium is incorporated into the gamma alumina structure;

and impregnating the support with at least one precursor of a metal of group VIB and at least one precursor of a metal of group VIII of the periodic table.

The catalyst of the present invention includes at least one hydrogenating metal from group VIB in oxide form, a promoter from group VIII also in oxide form deposited on a catalytically active inorganic mixed oxide support, constituted mainly of gamma-phase alumina and titanium. Thus, the present invention provides two processes of support synthesis: one of them from, for example, a commercial boehmite, which is peptized by using an inorganic acid, extruded, calcined and then impregnated with a solution containing titanium to obtain a titanium/alumina support ($TiO_2/Al_2O_3$); and other one in which the commercial boehmite is mechanically mixed with a titanium containing solution, it is peptized by using an inorganic acid, it is extruded and calcined to form gamma alumina and a $TiO_2/Al_2O_3$ catalyst support in which the titanium is incorporated into the gamma alumina structure on which the active phases and the promoter will be deposited.

The catalyst is activated by converting the metallic oxides into sulfides, which are responsible for the catalytic activity. The activation is carried out by means of a sulfidation process of the oxides that constitute the catalyst.

The catalysts synthesized with the processes of the present invention considerably improve the hydrodesulfurization activity. In addition, they are not quickly deactivated by poisoning from the contaminants that are contained in the heavy crudes, mainly metals such as nickel and vanadium. Thus, the catalysts produced in the present invention have a particular use in the hydrodesulfurization stage of hydrotreating processes for heavy crude and residua.

Accordingly, previous technologies are surpassed by the use of the catalyst of the present invention, particularly when it is used in the second reaction stage of hydrotreating process of residues and heavy crude oils, where the compounds of sulfur and metals (Ni and the V) are more refractory. Also, the catalyst of the present invention has physical, chemical and textural properties advantageously used in the hydrodesulfurization of residua and heavy crude with good activity, stability and minimum deactivation in long operating times.

BRIEF DESCRIPTION OF THE DRAWINGS

For better understanding the catalyst of the present invention, used principally for hydrodesulfurization of residua and heavy crude oil, in what follows we will refer to the figures that go with this document.

DETAILED DESCRIPTION OF THE INVENTION

Figure 1:
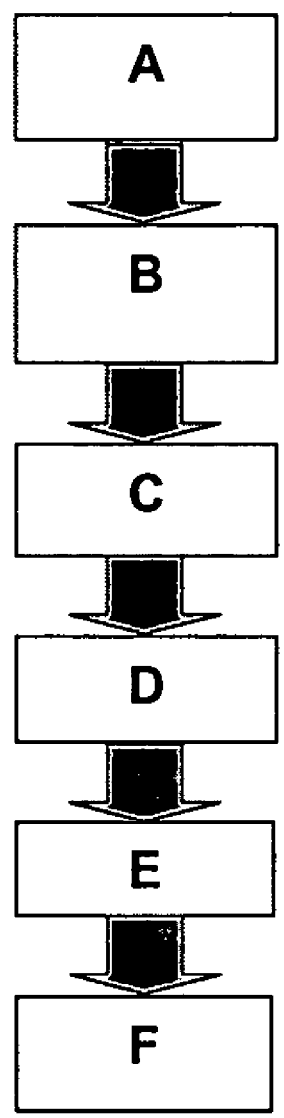
FIG. 1 is a diagram of the methodology used for the microreaction and pilot plant scale evaluation of the catalysts obtained with the processes of the present invention.

The present invention relates to a catalyst to be used principally in the second stage of a hydrotreating process for residua and crude oil particularly for the hydrodesulfurization reaction. More specifically, the present invention relates to the synthesis of catalysts for the hydrotreatment of streams containing hydrocarbons produced in the first stage of a catalytic hydrotreatment process. The stream to be processed in the second stage contains compounds of sulfur, nitrogen and metals (nickel and vanadium), as well as asphaltenic hydrocarbons.

Similar to the hydroprocessing of residua, the heavy crude oil hydroprocessing requires of a first hydrodemetallization (HDM) stage followed by a hydrodesulfurization (HDS) stage, with the objective of maximizing the useful life of the catalysts used in the second stage of reaction. The properties of the catalysts used in the two reaction stages must be different.

The catalyst used in the first hydrodemetallization stage must possess a high metal retention capacity. Therefore the greatest percentage of the pore distribution must be in the range of meso pores and macro pores (>25 nm), whereas for the catalyst used in the second reaction stage, which is to be used mainly for the hydrodesulfurization reaction, the greatest percentage of the pore size distribution must be in the range of meso pores (5-25 nm).

The pore size distribution in the catalyst support plays a key role in the catalyst performance. By adequately tailoring the catalyst pore volume it is possible to avoid problems of plugging by carbon or other contaminants which cause poor diffusion of the reactants to the interior of the catalyst and consequently its deactivation. The optimization of the pore size in the catalysts depends on the nature of the feedstock to be hydrotreated.

When heavy feedstocks are processed an ideal combination must exist between the specific surface area and catalyst pore diameters, to obtain high catalytic activity in the elimination of sulfur compounds. In this respect when the catalyst has large pore diameters, above 50 nm, catalyst deactivation is minor because the pores can not be blocked by deposits of contaminants such as metals (Ni and V) and carbon.

The chemical factors that control the good functioning of a catalyst are: the variety, the content and the proportion of active species (metals), the chemical state of the active species and their dispersion on the catalyst support. Other factors also important are the catalyst physical properties such as the specific surface area, average pore diameter and total pore volume, which are part of a good design of the support. Thus, the combination of the physical and chemical properties of the catalyst, as well as proper knowledge of the feedstock composition, and the optimization of the process variables result in a highly active, stable and selective catalyst.

Particularly, the present invention provides two processes for obtaining a catalyst to be used mainly in the hydrodesulfurization reaction, particularly of residua and heavy petroleum crude oil, produced in a first hydrotreatment reaction stage. The objective of the present invention is to use the catalyst described in the present invention to mainly diminish the sulfur content, although other parallel reactions such as hydrodemetallization (HDM), hydrodenitrogenation (HDN), and hydrodeasphaltenization (HDAs) can also take place, in order to produce a light crude oil and to improve the quality of the distillates. This catalyst has moderate initial activity but a great stability taking into account that the sulfur present in this reaction stage is contained in aromatic compounds of greater size.

In the second stage or second reaction zone, the catalyst can be used in a fixed bed reactor mode with an effective particle diameter of, for example, at least 1/16" (1.5875 mm). With some minor changes in the physical properties such as form and size, the catalyst can also be used in an ebulated bed reactor.

The catalyst of the present invention can process effectively feedstocks having, for example, small amounts of metals or up to 500 ppm of nickel plus vanadium, up to 10 weight % of asphaltenes, and sulfur content within the interval of 0.5-5 weight %.

To obtain the catalyst with the adequate properties to be used mainly in the second hydrotreating stage of residua and heavy crude oils either of the two following preferred processes can be used:

1. To prepare the binder, a fraction (5-20 wt %) of the total commercial boehmite is peptized with an inorganic acid, preferable using a ratio of binder/acid of 0.1-0.5. Then the remaining part of the boehmite (95-80 wt %) is added together with the amount of deionized water necessary to obtain a homogeneous paste adequate to be extruded. The extrudates obtained with the paste are maintained at 20-25° C. during 12-18 h., then they are dried at 100-120° C. during 2-6 h., and then they are calcined at 500-600° C. during 3-5 h, using a heating ramp of 2° C./min, to obtain gamma alumina. Based on the porosity of the support, the required amount of a titanium precursor to obtain 3-6 weight % titanium is incorporated in the support using the incipient wetness impregnation method. The impregnation solution is prepared with an organic solvent, preferably isopropanol. The impregnated support is maintained at 20-25° C. for 12-18 h. and then is dried at 100-120° C. and calcined at 400-500° C. to obtain the anatase phase of titania, in this way the titania remains on the surface of the gamma alumina. Finally, the titania/alumina ($TiO_2/Al_2O_3$) support is impregnated by incipient wetness impregnation with active precursors of groups VIB and VIIIB of the periodic table in a sequential or co-impregnation mode.

2. In another method, the titanium precursor was incorporated directly into a commercial boehmite followed by peptization with inorganic acid and de-ionized water with continuous mixing until a homogeneous paste of boehmite that can adequately be transformed into extrudates is obtained. The extrudates are left to mature at 20-25° C. for 12-18 h then are dried at 100-120° C. for 2-6 h, and then they are calcined at 500-600° C. for 3-5 h, using a heating ramp of 2° C./min. In this way a titania-alumina support in which titania is incorporated to the structure of gamma alumina is obtained. Finally, the titania-alumina support is impregnated by the incipient wetness or by the spraying methods, in successive or simultaneous mode with the metal precursors of the groups VIB and VIIIB of the periodic table.

Concerning the above two methods of catalyst preparation it is important to point out that:
a) Any suitable inorganic acid may be used in the synthesis of the support. However, a preferred inorganic acid is nitric acid of a concentration of 5-15 volume %.
b) Likewise, any suitable titanium precursor may be used for the synthesis of the support. However, a preferred titanium precursor is titanium iso-propoxide.
c) The simultaneous impregnation (co-impregnation mode), is performed with an aqueous basic solution (pH=9) that contains an active metal of group VIB, preferably Mo, in the form of, for example, ammonium heptamolybdate, and a precursor of any suitable group VIII, preferably, for example, Ni in the form of hexahydrated nickel nitrate.
d) The successive impregnation of the support involves first the impregnation of an active metal of group VIB, preferably Mo in the form of ammonium heptamolybdate, using an aqueous solution with basic pH (pH=9-9.5), with the respective stages of maturing drying and calcination, followed by the impregnation of a precursor of group VIII, preferably Ni, in the form of hexahydrated nickel nitrate, at neutral pH.

The catalyst obtained using the processes of the present invention consists of a support $TiO_2/Al_2O_3$ or $TiO_2$—$Al_2O_3$ with a titanium concentration of 3-6 wt %, in which the active metals are in concentrations of 8-10 wt % of molybdenum oxide and 2-6 wt % of nickel oxide, based in the total weight of the catalyst, amounts that have been found to produce an optimum hydrodesulfurization activity with minimum metal requirements.

In addition, the catalyst obtained with the procedures of the present invention has a moderate acidity of 70 to 120 mg of pyridine per gram of catalyst (70-120 mg Py/g cat), and well defined textural properties: specific surface area (SSA) of 90 to 300 m2/g, an average pore diameter (APD) of 5 to 15 nm and a pore volume (PV) of 0.2 to 0.7 cm3/g, as well as the following pore size distribution: Less than 30% of its pore volume from pores of 0-5 nm in diameter, from 55-80% of its pore volume supplied by pores of 5-10 nm of diameter, and less than 15% of its pore volume coming from pores with diameters of more than 10 nm.

EXAMPLES

For the evaluation of the catalytic activities of the hydrodesulfurization catalysts of the present invention, typical micro-reaction and pilot plants were used. In both types of plants, prior to the evaluation tests, experiments to determine the effect of upward or downward flow in the reactor, different levels of catalyst dilution with inert material were tested, as well as different values for the operating variables such as liquid hourly space velocity (LHSV), and reaction temperature. These experiments allowed to establish the methodology for the evaluation of catalysts summarized in FIG. 1.

FIG. 1 is an schematic representation of the methodology used for the micro-reaction evaluation of the catalysts described in the examples of the present invention. In step A, the reactor is loaded with 10 mL of catalyst and 10 mL of inert material (SiC). Stage B corresponds to the test of the equipment at a pressure 10% higher than the one used in normal operation ($P=1.1P_{op}$) in order to detect any leak in the experimental set up. Stage C describes the sulfidation of the catalyst, performed with gasoil from the atmospheric distillation of petroleum to which 1 wt % dimethyl disulfide was added (1 wt. % DMDS+SRGO). The following operating conditions were used for the sulfidation of the catalyst: reaction temperature 320° C., pressure 28 Kg/cm², LHSV 2.00 h⁻¹ and hydrogen/hydrocarbon ratio 2000 ft³/bbl. Step D corresponds to the operation of the catalytic test that is realized by a feeding to the reactor in ascending mode, the feed to the reactor is a 50/50 wt % mixture of hydrotreated Maya crude (HDT) and hydrodesulfurized diesel. The operating conditions in stage D are as follows: temperature of 380° C., pressure of 54 kg/cm², hydrogen/hydrocarbon ratio of 2,000 ft³/bbl, and LHSV of 1.0 h⁻¹. In stage E the reaction takes place during 120 h and during this time samples of product are taken every 12 h. Finally, in stage F, analysis of the products from the reactor is performed.

The best conditions found for the evaluation of catalysts at micro plant and plant pilot are those presented in Table 1. At pilot plant level the operating conditions for evaluation of the catalysts are more severe than at micro-plant level, the run time was increased to 200 h and the amounts of catalyst and inert material were 100 and 50 mL respectively.

TABLE 1

Operating conditions of for the evaluation of HDT catalysts

| Parameter | Micro plant | Pilot Plant |
|---|---|---|
| Temperature, ° C. | 380 | 400 |
| Space velocity (LHSV), h⁻¹ | 1.0 | 1.0 |
| Pressure, kg/cm² | 54 | 70 |
| Ratio H₂/hydrocarbon, ft³/bbl | 2,000 | 5,000 |
| Catalyst Volume, mL | 10 | 100 |
| Inert material volume (SiC), mL | 10 | 50 |
| Run time, h | 120 | 200 |

For the evaluation of the hydrodesulfurization catalysts at microplant level a synthetic feed consisting of a 50/50 wt % of heavy crude oil previously hydrotreated (HDT) and diesel hydrodesulfurized diesel HDS), which led to a metal concentration (Ni+V) lower than 150 ppm. For the evaluation of the catalysts at pilot plant scale undiluted raw Maya HDT was used. The most important properties of these fractions are shown in Table 2.

TABLE 2

Physical and chemical properties of the feedstocks

| Property | Micro plant | Pilot Plant |
|---|---|---|
| Elemental analysis | | |
| C, wt % | 83.2 | 85.5 |
| H, wt % | 9.5 | 7.2 |
| N, wt % | 0.118 | 0.1852 |
| S, wt % | 0.648 | 1.217 |
| Metals, ppm | | |
| Ni | 18.9 | 36.76 |
| V | 81.66 | 107.98 |
| (Ni + V) | 100.56 | 144.74 |
| Asphaltenes, wt % | 4.35 | 6.87 |
| Physical properties Density, 20/4° C. | 0.87 | 0.87 |
| Ramsbottom Carbon, wt % | 5.54 | 8.0 |

Hydrodesulfurized diesel (diesel HDS) also was used to prepare diesel contaminated with 1.0 wt % dimethyl disulfide (DMDS) reactant grade with a purity of 97%, which was used for the activation stage (sulfidation) of the catalyst.

The inert material used to dilute the catalytic bed was a silicon carbide (SiC) of 60 mesh equivalent to a particle diameter of 0.25 mm, and 30 mesh for the evaluation in pilot plant.

The activity of the catalysts of the present invention was first evaluated at microreaction level, using the following operating conditions: reaction temperature 380° C., space velocity (LHSV) of 1.0 h⁻¹, pressure of 54 kg/cm² and H₂/hydrocarbon ratio of 2,000 ft³/bbl, with a run time of 120 h.

The catalyst that presented the best results in the evaluation at microplant level was also evaluated at pilot plant scale at 400° C. reaction temperature, space velocity (LHSV) of 1.0 h⁻¹, pressure of 70 kg/cm² and a H₂/hydrocarbon ratio of 5,000 ft³/bbl, with a run time of 200 hours.

The following examples illustrate the present invention.

Example 1

In this example three commercial boehmites Catapal C-1, Catapal C-200 of Condea Vista and Versal 300 of Roche are used.

For the preparation of catalysts A3 and B2, Catapal C-1 and Versal 300 boehmites were used respectively. Part of the boehmite was used as binder to which the required amount of an aqueous solution with 10 wt % nitric acid (HNO₃) was added. Afterwards, little by little, the rest of the boehmite (filler) and deionized water were added until a homogenous paste was obtained. This paste was extruded with a piston to obtain cylindrical pellets of 1/16" of diameter. The extrudates were let to age for 12 to 18 hours, and then they were dried at 100-120° C. during 2-6 hours and subsequently calcined at 500-550° C. for 4 hours using a heating ramp of 2° C./min to obtain a gamma alumina support.

For catalyst C2 a mechanical mixture of Catapal C-1 (70 wt % was prepared) and Catapal C-200 (30 wt %) boehmites was prepared following the same previous procedure. Later these supports were impregnated by successive impregnation, first with ammonium heptamolybdate (HMA) and then with nickel nitrate to obtain a metal content of 10 wt %, and 4.3 wt % of Ni. The resulting solids were left to age for 12-18 hours, and then they were dried at 100-120° C. and calcined using a heating ramp of 2° C./min up to 120° C. at which temperature they remained for 2 hours, then rising the temperature up to 300° C. were they remained for 2 hours, and finally up to 450° C. where they remained for 4 hours.

The textural properties of these three catalysts (A3, B2 and C2) are shown in Table 3 where it is observed that such properties are totally different.

TABLE 3

Textural properties of the catalysts obtained by means of the process 1) of the present invention (Example 1)
Textural Properties

| Catalyst | SSA (m²/g) | PV (mL/g) | APD (nm) | PVD (Volume %) | | | |
|---|---|---|---|---|---|---|---|
| | | | | <5 | 5–10 | 10–25 | >25 |
| | | | | nm | | | |
| A3 | 162 | 0.4 | 9.2 | 20.4 | 75.1 | 3.5 | 1.0 |
| B2 | 195 | 0.6 | 13.0 | 3.8 | 51.5 | 41.3 | 3.4 |
| C2 | 127 | 0.3 | 10.0 | 8.6 | 84.3 | 4.9 | 2.2 |

SSA = specific surface area,
PV = Pore volume,
APD = Average pore diameter,
PVD = Pore volume distribution.

In Table 3, it is observed that although catalyst B2 is the one that has the greater SSA, PV and APD, catalyst A3 displays acceptable intermediate values. Also, catalyst A3 presents/displays a greater population of pores in the range<10 nm (95.5% of the volume), making evident that 75.1% of the volume is supplied by pores in the range 5-10 nm.

Figure 2:
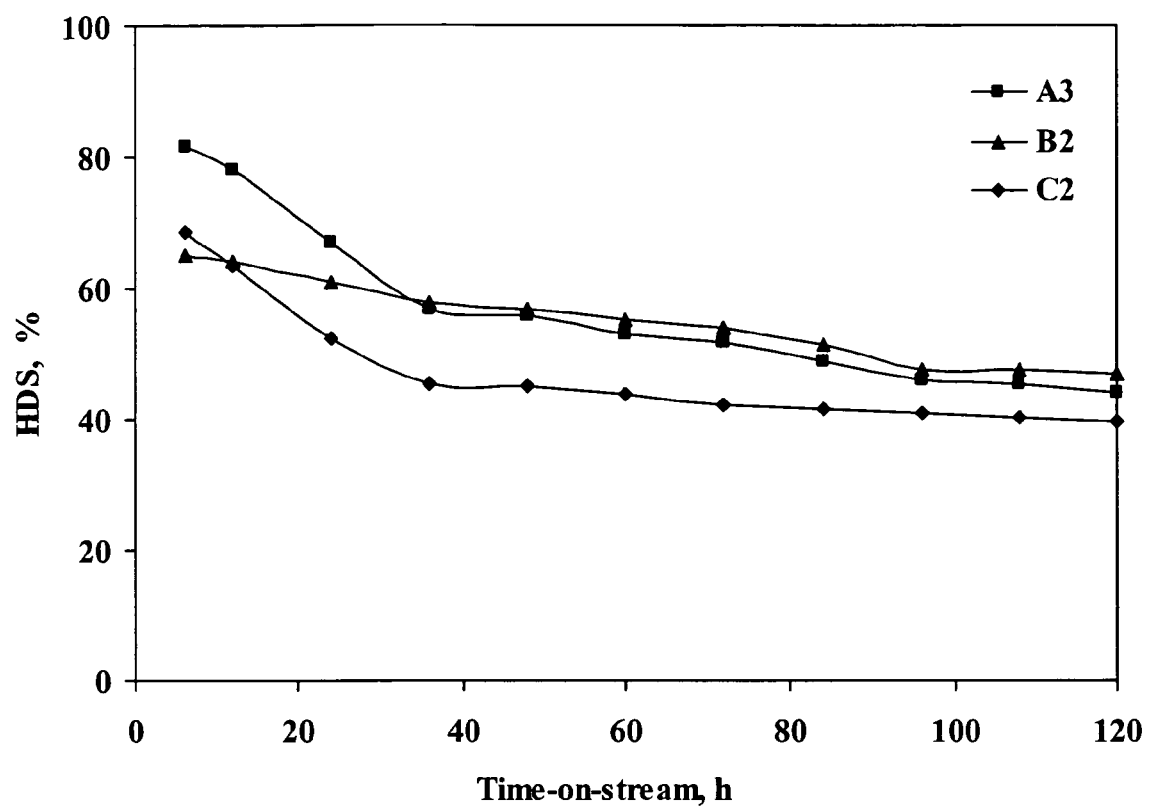
FIG. 2 is a graph showing the results of the effect of type of boehmite used as catalyst support on the activity and stability of the catalysts of the present invention.

The hydrodesulfurization activity of catalysts A3, B2 and C2, at a 120 hour run time, is shown in FIG. 2.

FIG. 2 is a graph of the results of the effect of type of boehmite on the activity and stability of the catalysts obtained by means of process 1) of the present invention. In this graph, it is observed that catalyst A3 is the one that presents the greater initial activity, 81.6% conversion of HDS at a run time of 6 h, and diminishes its activity until it stabilizes at 36 h run time, where a conversion of 47% HDS is obtained. This conversion value is similar to the one reached by catalyst B2 and slightly superior to the one displayed by catalyst C2.

Example 2

In this example, the same commercial boehmite Catapal C-1 considered in Example 1 was used. The support and catalyst were also prepared in similar way as in example 1, only that the contents of Mo and Ni were different.

The supports were impregnated using the incipient wetness method. This method is used when there is affinity among the metal complexes/solvent with the support matrix, leading to appropriate high diffusion of the catalytic agents, up to the saturation of the support pores.

The properties of catalysts C1, B1, and A3 from Example 1 are shown in Table 4.

TABLE 4

Physical and chemical properties of the catalysts obtained using process 1) of the present invention (Example 2)

| | Catalysts | | |
|---|---|---|---|
| | C1 | B1 | A3 |
| Chemical properties | | | |
| Mo, wt. % | 12.0 | 12.0 | 10.0 |
| Ni, wt. % | 12.0 | 8.0 | 4.3 |
| Ni/(Ni + Mo) | 0.5 | 0.4 | 0.3 |
| Textural properties | | | |
| SSA, $m^2/g$ | 140 | 146 | 162 |
| PV, mL/g | 0.29 | 0.31 | 0.38 |
| APD, nm | 7.9 | 7.9 | 9.2 |
| PSD, Volume % | | | |
| <5, nm | 26.8 | 22.6 | 20.4 |
| 5–10, nm | 69.6 | 75.1 | 75.1 |
| 10–25, nm | 2.0 | 1.5 | 3.3 |
| 25–50, nm | 1.1 | 0.5 | 0.7 |
| >50, nm | 0.5 | 0.3 | 0.5 |

SSA = specific Surface Area,
PV = Pore Volume,
APD = Average Pore Diameter,
PSD = Pore Size Distribution Table 4 shows that catalyst A3 has similar textual properties even though it has lower Mo and Ni contents (10 and 4.3 weight % respectively). Compared with catalysts B1 and C1, which have similar textural properties, catalyst A3 is the one that presents the best textural properties. The pore size distribution of catalysts A3 and B1 is similar in the interval of 5-10 nm (75.1% volume), while for C1 is slightly lower (69.6% volume) in the same range.

Figure 3:
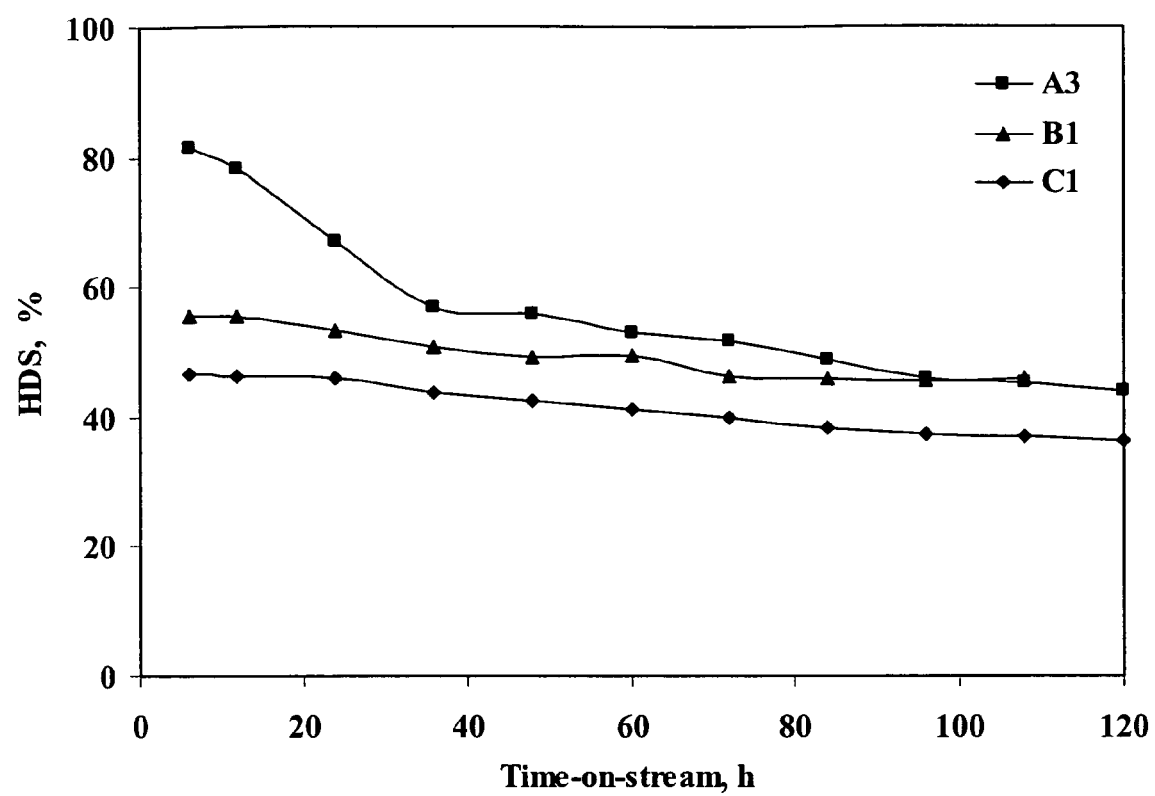
FIG. 3 is a graph the effect of the catalyst metal concentration on the activity and stability of the catalysts obtained by the process of the present invention.

The hydrodesulfurization activity of catalysts A3, B1 and C1 are presented in FIG. 3 up to 120 hour time-on-stream.

FIG. 3 shows results of the variation in the metal content on the activity and stability of the catalysts obtained by means of the process 1 of the present invention. It is observed that although catalyst A3 contains a lower amount of metals (10 wt % Mo and 4.3 wt % Ni), it is the one that presented a greater initial activity (81.6% HDS), compared to catalysts B1 and C, which displayed an initial HDS activity of 60.6 and 46.5% respectively. The activity of catalyst A3 stabilizes after 36 h of time-on-stream, reaching a HDS conversion of around 47%, similar to the one presented by B1 and slightly superior to the C1.

The results in Table 4 and FIG. 3 indicate that there must be an optimum metal content to obtain good activity and stability of the catalyst because when the metal content is increased the catalyst activity does not increases accordingly.

Example 3

A gamma alumina support was prepared with same preparation method as in Example 1 and 2 using Catapal C-1 as a base material. This support was impregnated by the incipient wetness impregnation method with a solution of titanium isopropoxide in isopropanol to obtain 5 weight % titanium in the support. The titania impregnated support was aged, dried, and calcined as reported in the Example 1, to obtain anatase titanium oxide on the alumina support. To prepare catalyst C3 the titanium-modified support was impregnated with Mo and Ni as described in Example 1, and the steps of aging, drying, and calcination were the same as those described in Examples 1 and 2.

The properties catalyst C3 as well as those of catalyst A3 from Example 1 are shown in Table 5.

TABLE 5

Properties of the catalysts obtained by means of the process 1) of the present invention (Example 3)

| | Chemical content, wt. % | | | Textural properties | | |
|---|---|---|---|---|---|---|
| | | | | SSA | PV | APD |
| Catalysts | Ti | Mo | Ni | $(m^2/g)$ | (mL/g) | (nm) |
| A3 | | 10.0 | 4.3 | 162 | 0.38 | 9.2 |
| C3 | 5.0 | 10.0 | 4.3 | 144 | 0.32 | 8.9 |

SSA = specific Surface Area,
PV = Pore Volume,
APD = Average Pore Diameter,
PSD = Pore Size Distribution Table 5 shows that the textural properties of catalysts A3 and C3 are different. The SSA, PV and APD of catalyst C3 are lower compared to catalyst A3. The lower values obtained for catalyst C3 are due to the incorporation of Ti to the $Al_2O_3$ support.

Figure 4:
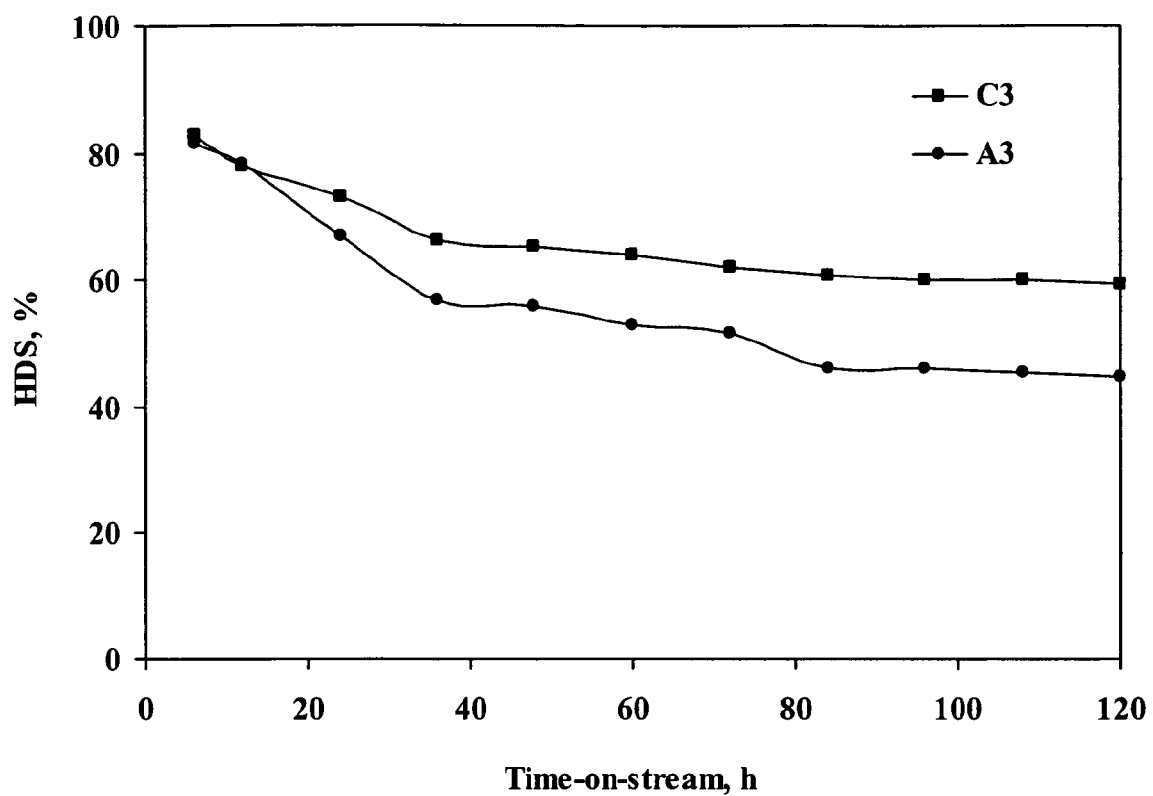
FIG. 4 shows the results on the effect of the titanium content on the activity and stability of the catalysts obtained by means of the process of the present invention.

The HDS activity of catalysts A3 and C3 at 120 h time-on-stream are shown in FIG. 4.

FIG. 4 presents the results of the effect of the incorporation of titanium to the alumina support on the activity and stability of the catalysts obtained by means of process 1) of the present invention. In this graph catalyst C3, which contains 5 weight % titanium, is the one that showed a better stability maintaining an HDS conversion of approximately 63% from 36 to 120 h time-on-stream. Catalyst A3, without Ti, although its activity was initially similar to catalyst C3, presents greater deactivation reaching an HDS conversion of approximately 47% after 36 h time-on-stream.

Example 4

For this example, a boehmite Catapal C-1 was also used. A titanium modified alumina support was prepared by using process 2) of the present invention. The boehmite was dried during 2-5 h at a temperature of 100-120° C. to eliminate the humidity that could exist in the sample, later, it was impregnated with a titanium isopropoxide/isopropanol solution to obtain a support containing 5 wt % titanium, the isopropanol volume used depends on the porosity factor of the boehmite, which in this case was of 0.6 mL/g. Thus a $TiO_2$—$Al_2O_3$ support was obtained. The steps of aging, drying, and calcination were made as in the previous examples. Later, the support was impregnated with HMA and nickel nitrate similarly as in the preceding examples, originating catalyst B3.

The textural properties of catalyst B3 as well as those of catalyst C3 from the Example 3 are shown in Table 6.

TABLE 6

Textural properties of the catalysts obtained by the process of the present invention (Example 4)

| Textural properties | Catalysts | |
| --- | --- | --- |
|  | C3 | B3 |
| SSA, $m^2/g$ | 144 | 166 |
| PV, mL/g | 0.32 | 0.26 |
| APD, nm | 8.9 | 6.2 |
| PVD, % Vol. | | |
| <5, nm | 20.1 | 80.4 |
| 5–10, nm | 75.3 | 12.5 |
| 10–25, nm | 3.1 | 5.0 |
| 25–50, nm | 0.2 | 1.9 |
| >50, nm | 1.0 | 0.3 |

SSA = Specific surface area,
PV = Pore volume,
APD = Average pore diameter,
PVD = Pore volume distribution.

It is observed in Table 6 that catalyst C3 presents a smaller SSA (144 $m^2/g$) unlike catalyst B3 (166 $m^2/g$), whereas the PV and APD are greater for catalyst C3 (0.32 mL/g and 8.9 nm respectively) than those presented by catalyst B3. Also, the pore size distribution of catalyst C3 is mainly concentrated in the interval of 5-10 nm (75.3% of the total pore volume), whereas catalyst B3 exhibits 80.4% in the interval of pores<5 nm.

Figure 5:
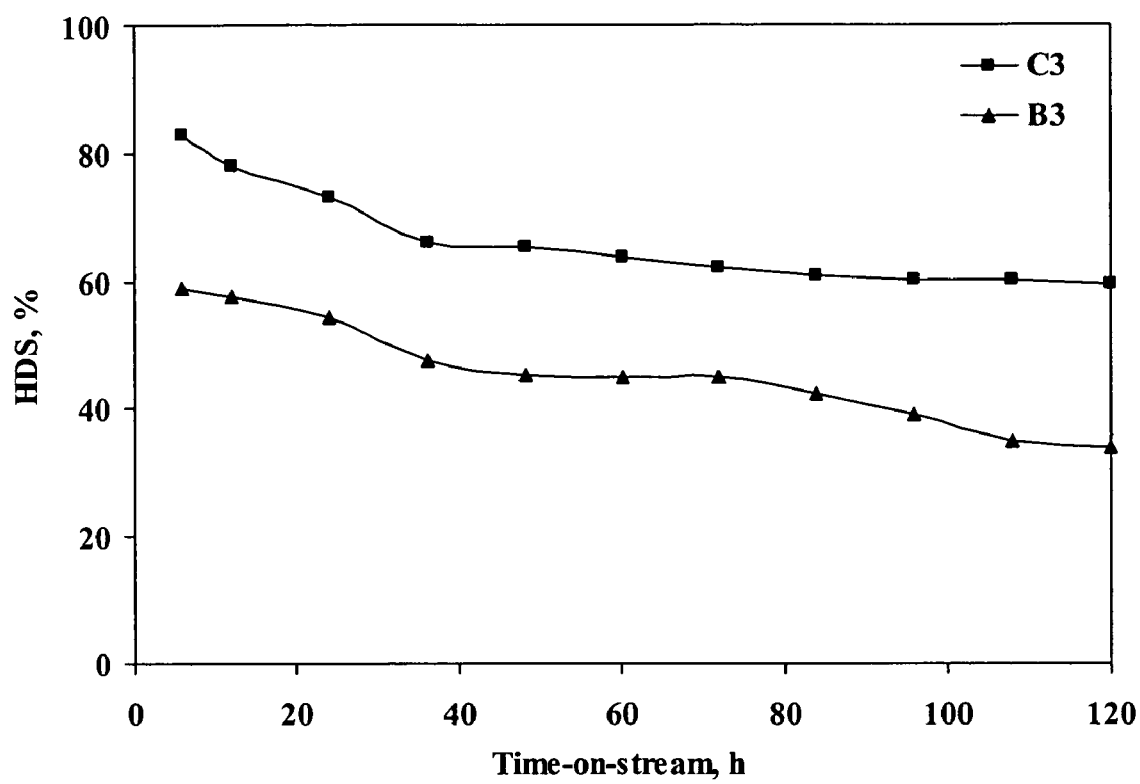
FIG. 5 is a graph of the results on the effect of the method of titanium incorporation onto the alumina [$TiO_2/Al_2O_3$] and within the structure of boehmite [$TiO_2$—$Al_2O_3$] on the activity and stability of the catalysts of the present invention.

The hydrodesulfurization activity of catalysts C3 and B3, at 120 h time-on-stream is shown in FIG. 5.

FIG. 5 shows the results of the effect of the method of titanium incorporation on the activity and stability of the catalysts obtained by means of the processes of the present invention. In this Figure, it is observed that the method of incorporation of titanium is very important; catalysts C3 and B3 show the same titanium content (5 wt %). The catalyst C3, where the titanium was impregnated on the surface of the $Al_2O_3$ support ($TiO_2/Al_2O_3$), presented an initial activity at 6 h of time-on-stream of 82.9% of HDS and a stable operation from 36 h up to 120 h of time-on-stream at 59.5% of HDS, in contrast to catalyst B3, where the titanium was added to the boehmite by mechanical mixing ($TiO_2$—$Al_2O_3$), for which the initial activity was 59.0% of HDS and decreases to 34% of HDS at 120 h of time-on-stream.

Clearly, catalyst C3 shows a better initial activity and stability than catalyst B3, because it possesses a greater percentage of pores in the interval from 5 to 10 nm (75.3% volume).

Example 5

The $TiO_2/Al_2O_3$ support used to prepare catalyst C3, was also used to prepare the catalyst of this example (D3). Catalyst D3 was synthesized by simultaneous impregnation of the support with a solution prepared in the following way: in a three-neck flask continuously and vigorously stirred, the required amount of an aqueous solution of $NH_4OH$, 3:1 $H_2O$/$NH_3OH$, was placed adding slowly the ammonium heptamolybdate $(NH_4)_6Mo_7O_{24}.4H_2O$, until a colorless transparent solution having pH=9-9.5 was obtained. After, the required volume of water to fill the pores of the support was added. Immediately after the nickel nitrate $Ni(NO_3)_2.6H_2O$(NNi) is added slowly, giving as result a solution of intense blue color with a Mo content of 10 wt % and 4.3 wt % of Ni. The properties of these catalysts are given in Table 7.

TABLE 7

Textural properties of the catalysts obtained by the processes of the present invention (Example 5)

| Textural properties | Catalyst | |
| --- | --- | --- |
|  | C3 | D3 |
| SSA, $m^2/g$ | 144 | 152 |
| PV, mL/g | 0.32 | 0.33 |
| APD, nm | 8.9 | 8.6 |
| PSD, volume % | | |
| <5, nm | 20.1 | 27.1 |
| 5–10, nm | 75.3 | 68.7 |
| 10–25, nm | 3.1 | 3.1 |
| 25–50, nm | 0.2 | 0.7 |
| >50, nm | 1.0 | 0.4 |

SSA = Specific surface area,
PV = Pore volume,
APD = Average pore diameter,
PSD = Pore volume distribution.

Table 7 shows that catalyst D3 has a higher SSA (152 $m^2/g$) than catalyst C3 (144 $m^2/g$), whereas the PV and the APD are similar, the PSD slightly changes i.e. the interval of pores<5 nm is 20.1% of the total volume for catalyst C3 while it is 27.1% for catalyst D3. The opposite trend was observed for the pores in the 5-10 nm range, in this case the percent volume is greater for catalyst C3 (75.3% volume) respect to catalyst D3 (68.7% volume); in the remaining intervals the pore volume distributions are similar.

Figure 6:
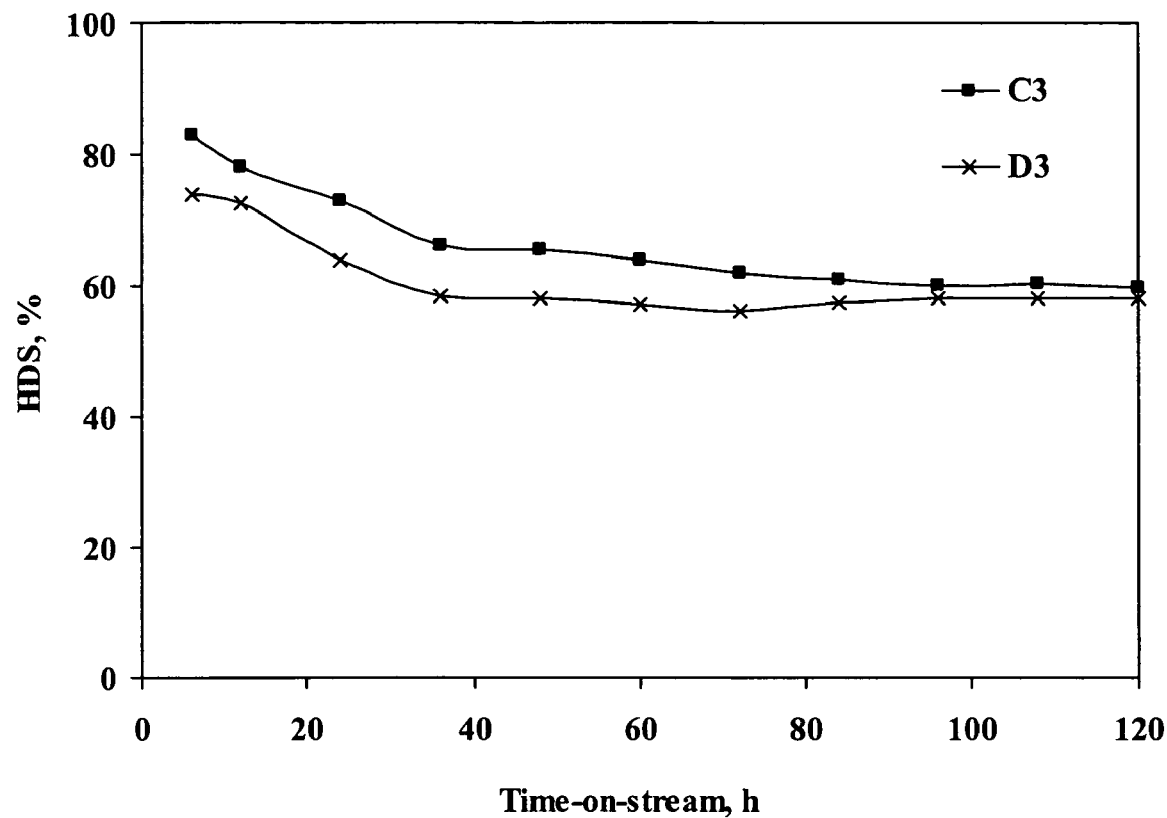
FIG. 6 is a graph showing the results on the effect of the method of impregnation of molybdenum and nickel, simultaneous and successive, on the activity and stability of the catalysts of the present invention.

The hydrodesulfurization activities of catalysts C3 and D3 are shown in FIG. 6 at 120 h of time-on-stream.

FIG. 6 shows the results of the effect of the impregnation method of molybdenum and nickel, simultaneous or successive, on the activity and stability of the catalysts obtained by means of the processes of the present invention. It is observed in this figure that catalysts C3 and D3 show a similar behavior, although the catalyst C3, which was impregnated sequentially first Mo and then Ni, followed by the drying and calcination steps, displayed a higher initial activity of 82.9% of HDS conversion at 6 h run time, while catalyst D3 displayed an activity of 74% HDS conversion. Both catalysts became stable at 36 h of time-on-stream giving an HDS conversion of 59.5% for the catalyst C3 and 58.1% for catalyst D3.

In other words, catalyst C3 showed a slightly better initial activity and stability than catalyst D3, because it has higher percentage of pores in the interval from 5 to 10 nm (75.3% volume).

Example 6

According to the positive results obtained in the evaluation of catalyst C3 at micro-plant scale after 120 hours of timeon-stream, this catalyst was evaluated at pilot plant scale during 200 h of time-on-stream. The reaction conditions were mentioned previously (Table 2). The behavior of catalyst C3 at pilot plant scale is presented in FIG. 7.

Figure 7:
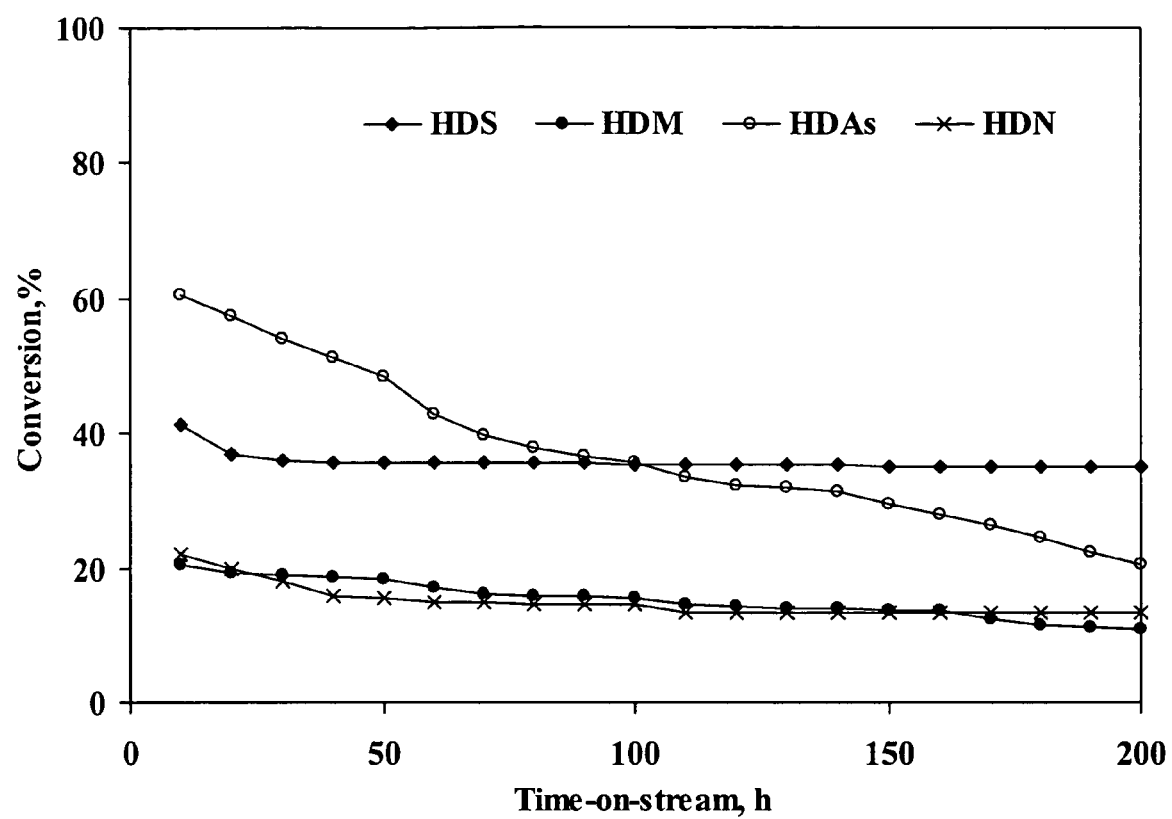
FIG. 7 is a graph showing the results of the activity and stability of the catalyst of the present invention.

FIG. 7 shows the results of activity and stability of catalyst C3 of the present invention evaluated at pilot plant scale. The formulation of catalyst C3 exhibited the best activity in the micro plant tests, therefore it was decided to evaluate this catalyst at pilot plant scale, using a feedstock containing the most refractory sulfur compounds. In FIG. 7 it is observed that catalyst C3 presents constant stable behavior from 12 h up to 200 h time-on-stream, which was the duration of the test, maintaining an HDS conversion level of 40%. In the same figure the behavior of catalyst C3 in the HDM, HDN, and HDAs reactions is also observed. The HDM and HDN reactions presented the same stability maintaining a conversion of 20% from 6 h up to 120 h. The HDAs reaction exhibits a high initial activity at 6 h (higher than 60% HDAs) compared to the HDS, HDN and HDM reactions, however, the HDAs conversion drops quickly from 60.4% to 20.4%.

While advantageous embodiments have been chosen to illustrate the invention, it will be understood by those skilled in the art that various changes and modifications can be made therein without departing from the scope of the invention as defined in the appended claims.

What is claimed is:

1. A process for preparing a catalyst for the hydrodesulfurization of residua and heavy crudes previously treated in a first stage of the hydrotreating process, comprising the steps:
    a. preparing a support from boehmite in which 5-20 wt % of the total boehmite is peptized with an inorganic acid to form a binder and the remainder of the boehmite and deionized water are added to the binder to form a homogenous paste, and forming said paste into extrudates;
    b. aging said extrudates at a temperature of 20°-25° C. for 12-18 hours, drying said extrudates at a temperature of 100°-120° C. for 2-6 hours, and calcining said dried extrudates at a temperature of 500°-600° C. for 3-5 hours using a heating ramp of 2° C./min, to obtain gamma alumina;
    c. impregnating the gamma alumina with a titanium precursor by the incipient wetness impregnation method using an organic solvent to provide content of 3-6 wt % of titanium;
    d. aging the impregnated support at a temperature of 20°-25° C. for 12-18 hours, followed by drying at a temperature of 100°-120° C. and calcining at a temperature of 400°-500° C., to obtain the anatase phase of titanium on the surface of the gamma alumina; and
    e. impregnating the resulting titania/alumina support ($TiO_2/Al_2O_3$) with a precursor of a metal from group VIB and group VIIIB of the periodic table by spraying or incipient wetness methods, either in simultaneous or sequential form.

2. The process of claim 1, wherein the inorganic acid used during the support synthesis is nitric acid at a concentration of 5-15 volume %.

3. The process of claim 1, wherein the inorganic acid used in the support synthesis is nitric acid with a binder/acid ratio of 0.1-0.5.

4. The process of claim 2, wherein the inorganic acid used in the support synthesis is nitric acid with a binder/acid ratio of 0.1-0.5.

5. The process of claim 1, wherein the titanium precursor used in the support synthesis is titanium isopropoxide.

6. The process of claim 1, wherein the organic solvent used in the support synthesis is isopropanol.

7. The process of claim 1, wherein simultaneous impregnation is conducted with a basic aqueous solution at pH of 9-9.5, which contains Mo and Ni.

8. The process of claim 7, wherein simultaneous impregnation is conducted with a basic aqueous solution at pH of 9-9.5, which contains ammonium heptamolybdate and hexahydrate nickel nitrate.

9. The process of claim 1, wherein sequential impregnation is conducted, the first step using ammonium heptamolybdate at a basic pH of 9-9.5 followed by aging, drying and calcination, and thereafter impregnation of a hexahydrate nickel nitrate at a pH of 5.5.

10. A process for the preparation of a catalyst for hydrodesulfurization of residua and heavy crudes previously treated in a first stage of a hydrotreating process, which comprises the steps of:
    a. preparing a support by incorporating a titanium precursor into boehmite, peptizing the mixture of boehmite and titanium precursor using an inorganic acid and deionized water to form a homogeneous paste, and extruding said paste to form extrudates;
    b. aging the extrudates at a temperature of 20°-25° C. for 12-18 hours, and then said aged extrudates are dried at 100°-120° C. for 2-6 hours, and calcined at 500°-600° C. for 3-5 hours using a heating ramp of 2° C./min to obtain a titania-gamma alumina support; and
    c. impregnating said titania-gamma alumina support by spraying or incipient wetness methods, either in simultaneous or sequential form, with a precursor of a metal from group VIB and group VIIIB of the periodic table.

11. The process of claim 10, wherein the inorganic acid used in the support synthesis is nitric acid at a concentration of 5-15 volume %.

12. The process of claim 10, wherein the titanium precursor used in the support synthesis is titanium isopropoxide.

13. The process of claim 10, wherein the simultaneous impregnation is conducted using a basic aqueous solution at pH of 9-9.5, which contains Mo and Ni.

14. The process of claim 13, wherein the simultaneous impregnation is conducted using a basic aqueous solution at a pH of 9-9.5, with ammonium heptamolybdate and hexahydrate nickel nitrate.

15. The process of claim 10, wherein sequential impregnation is used with ammonium heptamolybdate at a basic pH of 9-9.5 followed by aging, drying and calcination, and then impregnation using hexahydrate nickel nitrate at a pH of 5.5.

* * * * *